Dec. 13, 1955  B. K. TICE  2,726,598
BALER TYING MECHANISM

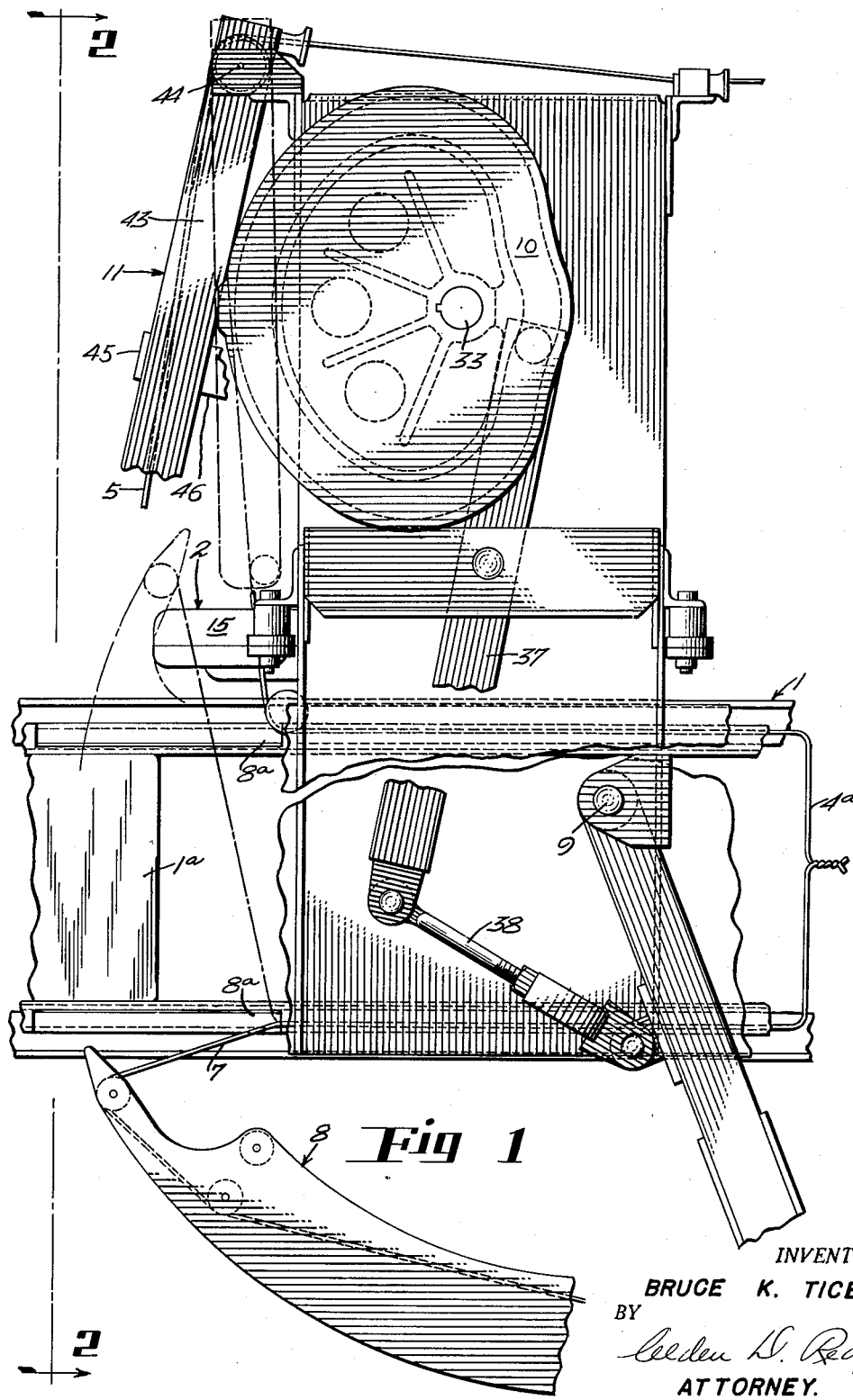

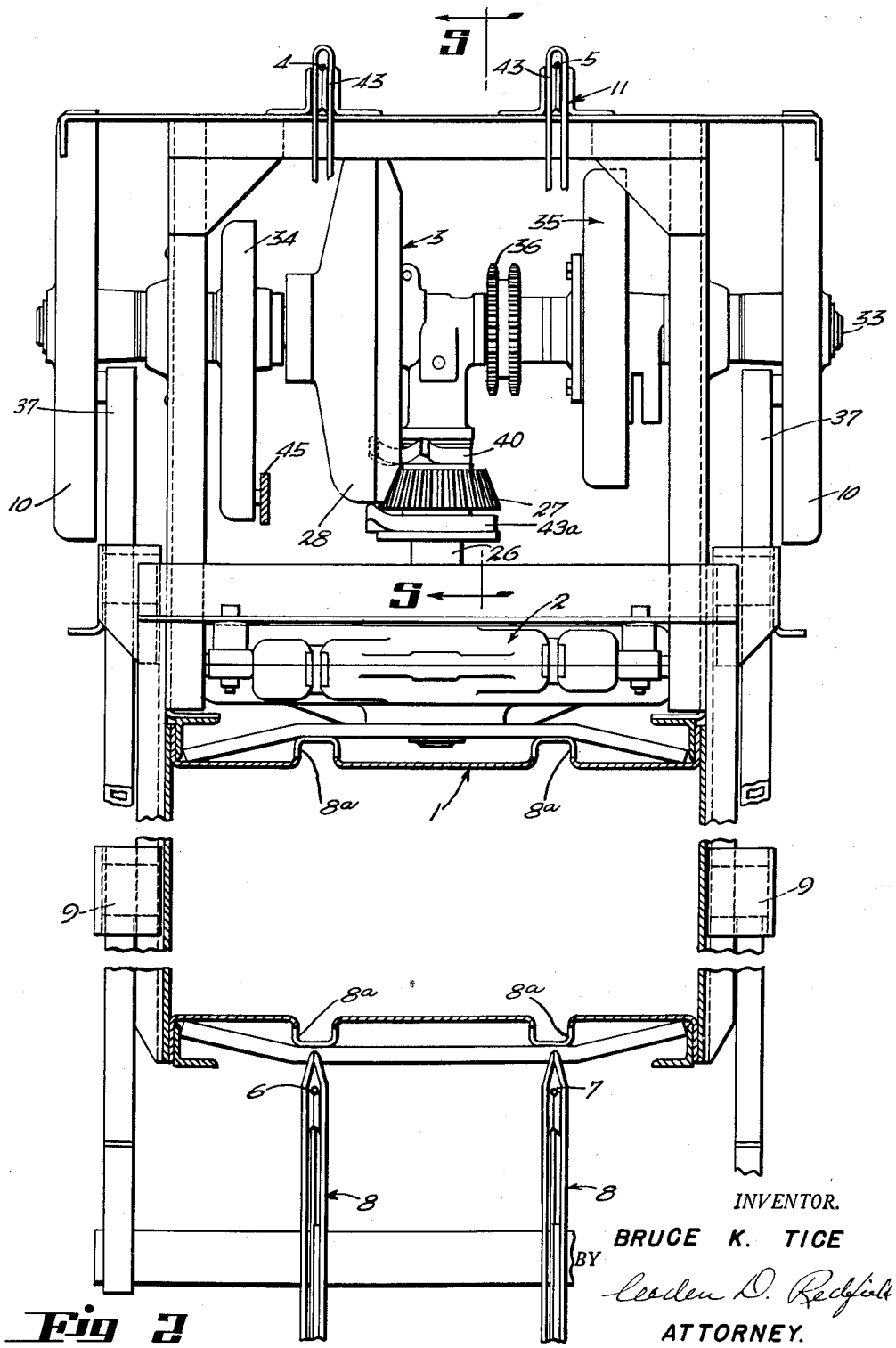

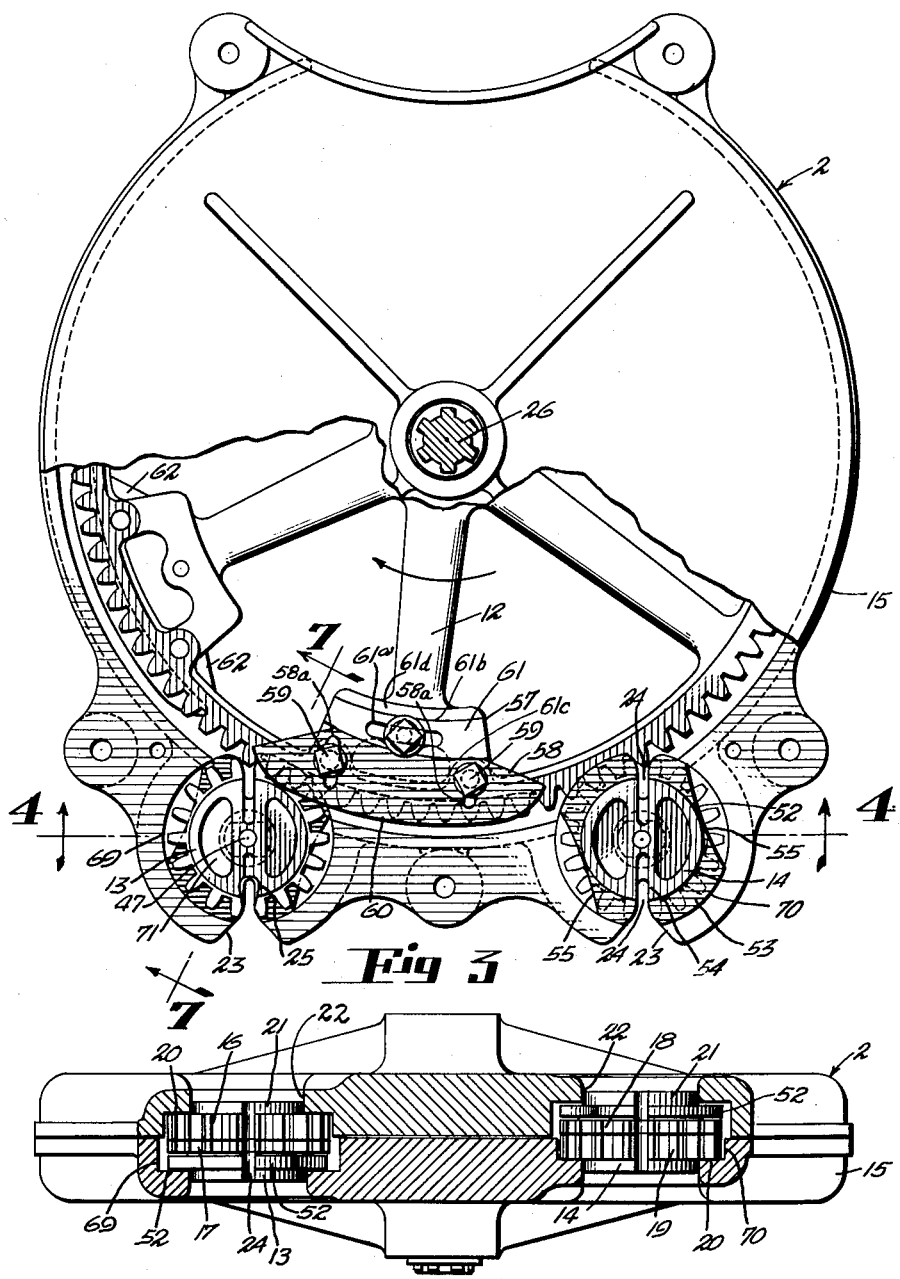

Filed May 12, 1951  8 Sheets-Sheet 4

INVENTOR.
BRUCE K. TICE
BY
Leeden D Redfield
ATTORNEY.

Dec. 13, 1955  B. K. TICE  2,726,598
BALER TYING MECHANISM
Filed May 12, 1951  8 Sheets-Sheet 5

INVENTOR.
BRUCE K. TICE
BY
*Leeden D Redfield*
ATTORNEY.

Dec. 13, 1955  B. K. TICE  2,726,598
BALER TYING MECHANISM
Filed May 12, 1951  8 Sheets-Sheet 6

INVENTOR.
BRUCE K. TICE.
BY
ATTORNEY.

Dec. 13, 1955   B. K. TICE   2,726,598
BALER TYING MECHANISM

Filed May 12, 1951   8 Sheets—Sheet 7

INVENTOR.
BRUCE K. TICE.
BY
*Leeden D. Redfield*
ATTORNEY.

Dec. 13, 1955   B. K. TICE   2,726,598
BALER TYING MECHANISM

Filed May 12, 1951   8 Sheets-Sheet 8

INVENTOR.
BRUCE K. TICE.
BY
ATTORNEY.

United States Patent Office 2,726,598
Patented Dec. 13, 1955

2,726,598

BALER TYING MECHANISM

Bruce K. Tice, Celina, Ohio, assignor to Avco Manufacturing Corporation, Cincinnati, Ohio, a corporation of Delaware Application May 12, 1951, Serial No. 225,931

11 Claims. (Cl. 100—11)

The present invention relates to a tying mechanism for use in a bailing machine such as commonly employed for agricultural purposes.

More particularly the present invention relates to a tying mechanism for binding loose material by means of baling wires which are first twisted together and then severed to form individual bales. The present invention constitutes a very substantial advance over other devices which have performed similar functions heretofore.

More specifically the present invention relates to a hay baler tying mechanism for twisting baling wires together in pairs and thereafter shearing each of the baling wires individually in seriatim. Two sets of twister pinions are provided for this purpose, each set comprising two portions, each formed to define a pair of spaced wire receiving slots into which the baling wires are fed by other cooperating parts of the baler. An intermittent driving means is provided for imparting controlled rotation to the twister pinions. The pinions are at first moved intermittently while the baling wires are supplied to the twister pinions, after which several full revolutions are imparted to the pinions for twisting the baling wires together. After the completion of the twisting operation, one portion of each set of twister pinions is momentarily held motionless so that relative motion is produced between the portions of each set. Since the edges of the wire receiving slots are hardened and sharpened, this relative motion shears the baling wires which have been previously joined.

The design of the slots in the twister pinions is an important feature of the present invention. By making one slot in each set slightly wider than the remaining slots and by properly timing the point at which the one portion of each set of twister pinions is held motionless, it is possible to sever each of the baling wires in sequence. It will be appreciated by those skilled in the art that this is a highly beneficial result which improves the action of the tying mechanism by reducing to a minimum the stresses in the baler produced by shearing of the wires.

In view of the foregoing, it is an object of the present invention to provide an improved type of baler tying mechanism by which pairs of baling wires can be securely joined and sequentially severed in a positive and controlled manner.

A further object of the present invention is to provide intermittent driving means in combination with improved twister pinions of the type disclosed whereby predetermined movements are imparted to the twister pinions so that the wires to be joined may be fed positively into the spaced slots formed in the twister pinions.

Another important feature of the present invention is the provision of improved adjustable means for arresting the motion of one portion of each set of twister pinions whereby relative movement is produced within each set for shearing the baling wires at the completion of the tying operation.

A still further object is the construction of each set of twister pinions whereby a pair of baling wires joined thereby may be severed in sequence by the edges of a pair of correspondingly positioned wire receiving slots. It is also an object of the present invention to provide a twister pinion structure wherein the axial thrust produced between the portions of each set of pinions by the twisting operation does not hinder their subsequent relative movement whereby the baling wires are severed.

Another very important object of the present invention is to provide a tying mechanism including a specially designed driving gear having a portion of its gear teeth removed in a particular fashion whereby a plurality of sets of twister pinions can be driven and controlled in a predetermined manner for joining pairs of baling wires and severing the wires sequentially.

Another feature of the present invention resides in the tooth proportions of the driving gear and pinions so that one portion of each set of twister pinions can remain in mesh with the gear teeth at all times despite the fact that the other portion of each set of pinions is periodically held motionless while the baling wires are being severed.

A very important feature of the present invention is its construction and arrangement making possible interchangeability of parts as well as prolongation in the life of the parts by distribution of peak loads over a maximum number of teeth in each set of twister pinions. Furthermore, it is an object of the present invention to provide a structure wherein the sets of twister pinions may be interchanged so that both edges of each wire receiving slot may be fully utilized in shearing baling wires during the life of the pinion.

The novel features that are considered characteristic of this invention are set forth in the appended claims; the invention itself, however, both as to its organization and method of operation, together with additional objects and advantages thereof, will best be understood from the following description of a specific embodiment when read in conjunction with the accompanying drawings, in which:

Fig. 1 is a side elevational view of a portion of a baler chamber with the improved tying mechanism of the present invention as well as other related elements in cooperative disposition, certain portions of the baler chamber being broken away to facilitate illustration of the interior construction;

Fig. 2 is a cross-sectional view taken on plane 2—2 of Fig. 1 showing the baler chamber in section as well as the front elevational view of the tying mechanism and its driving means;

Fig. 3 is an enlarged top plan view of the tying mechanism proper, part of the casing thereof being broken away to facilitate the illustration of its interior construction;

Fig. 4 is a cross-sectional view taken on plane 4—4 of Fig. 3 showing two sets of twister pinions in wire receiving positions;

Figure 14:
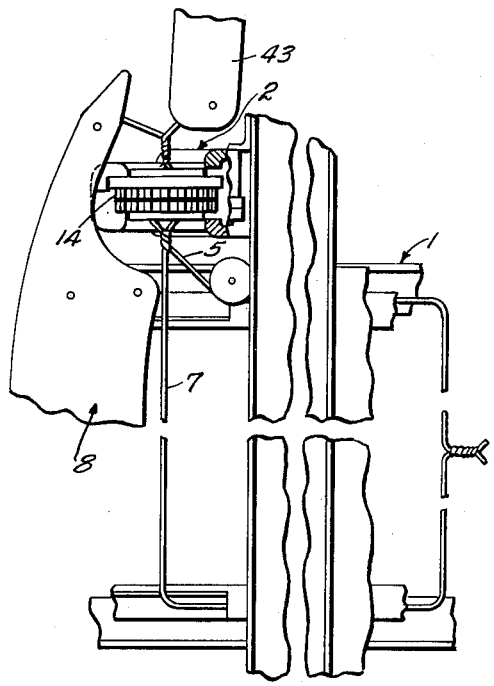
Figure 15:
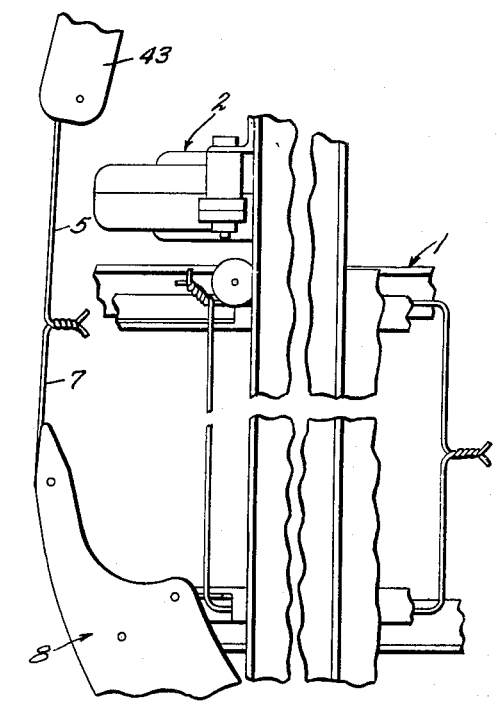
Figure 8:
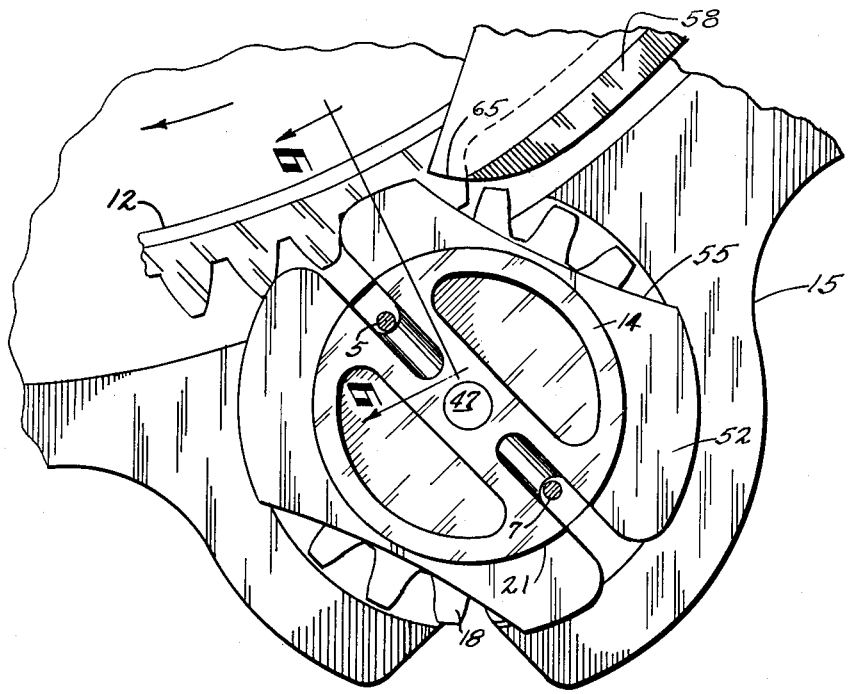
Figs. 8, 10 and 12 show successive positions of a set of twister pinions assumed in the course of twisting together and severing a pair of baling wires for binding a bale.
Figure 9:
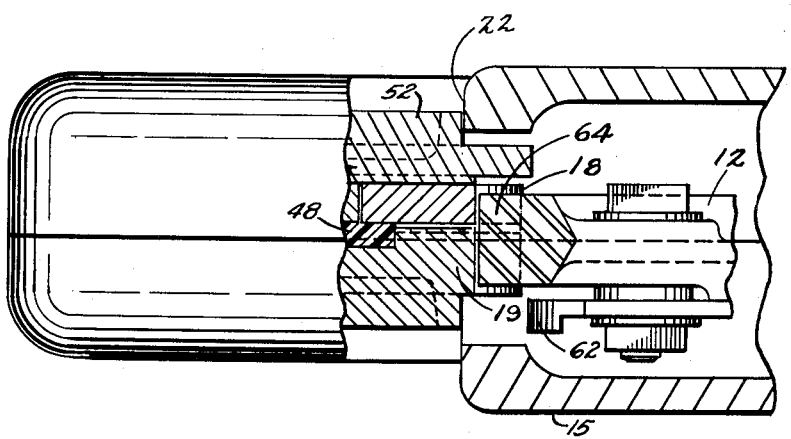
Figure 10:
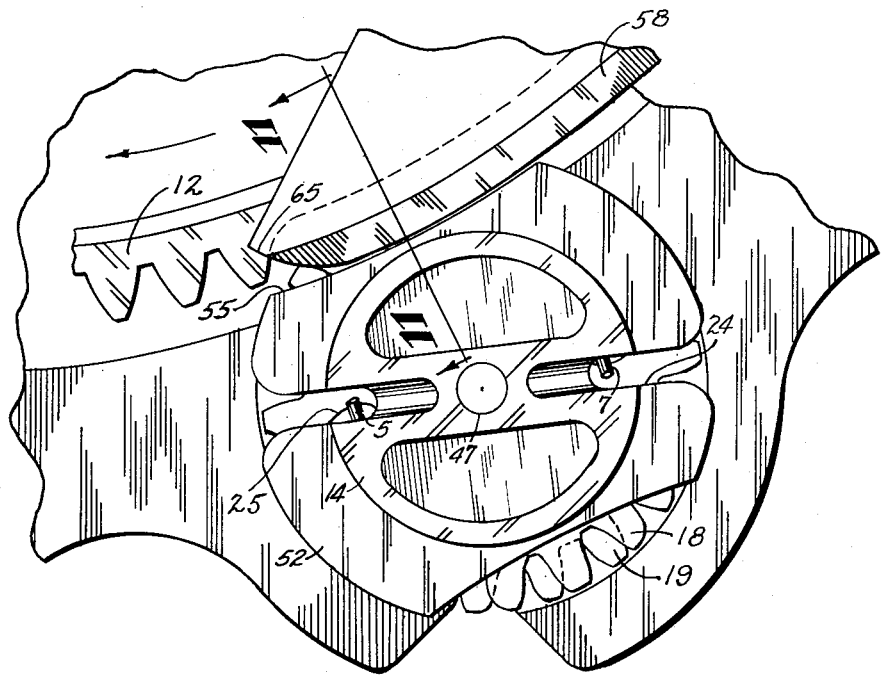
Figure 11:
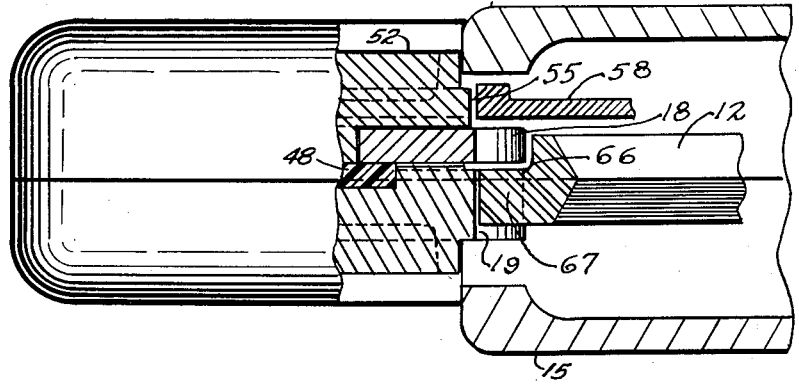
Figure 12:
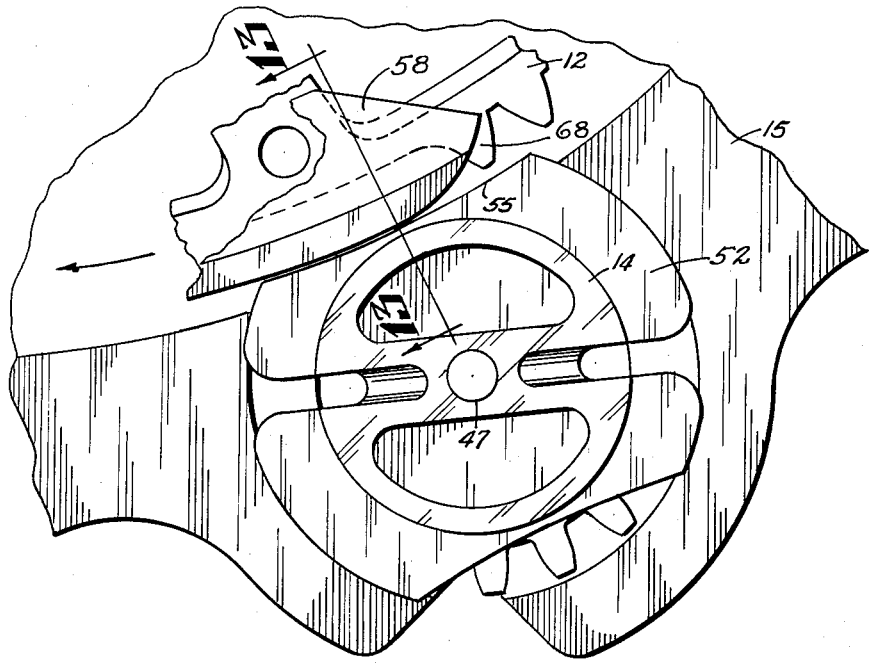
Figure 13:
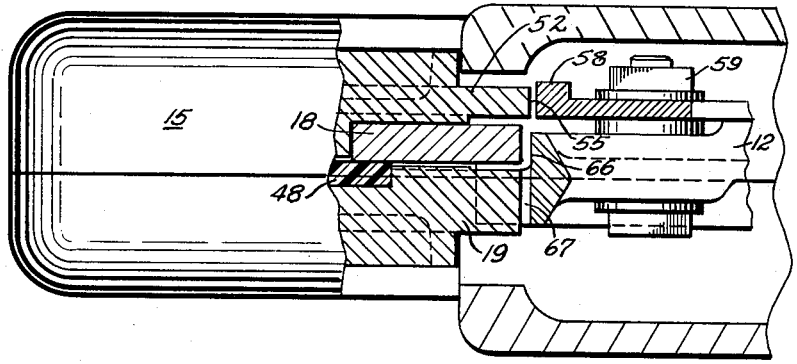

Figs. 9, 11 and 13 are cross-sectional views of the twister pinions in their successive positions taken on planes 9—9, 11—11, and 13—13 of Figs. 8, 10, and 12, respectively;

Fig. 14 shows, to a reduced scale, a pair of wires being twisted together by the twister pinions; and Fig. 15 shows the position of the tying mechanism and associated components shortly after severance of the baling wires.

General arrangement

The present invention finds particular utility in that type of baler which includes an elongated baler chamber of rectangular cross section, generally designated 1 in Figs. 1 and 2, into which the material to be baled is fed. It is conventional to provide a reciprocating plunger 1a within the baler chamber which oscillates periodically to compress and move towards the right in Fig. 1 the hay and other material to be compacted and tied with baling wires. This plunger has only been indicated schematically since it has no bearing on the present invention.

A tying mechanism, generally designated 2, is mounted above the baler chamber and is driven by an intermittent driving means, generally designated 3. The tying mechanism twists the upper and lower baling wires 4, 5 and 6, 7 respectively, together thereby binding the material that has been compressed within the baler chamber.

It will be appreciated by those skilled in the art that some means must be provided to carry the lower baling wires across the baler chamber and up to the tying mechanism when a sufficient amount of material has been compressed to form an individual bale. A pair of wire carrying needles, generally designated 8 (see Figs. 1 and 2), have been provided for this purpose and are swung periodically about stub shafts 9 by needle cams 10 to carry the lower baling wires 6, 7 upwardly through slots 8a in the baler chamber and into engagement with the tying mechanism 2. Before arrival of the wire carrying needles, however, the upper baling wires 4, 5 are delivered to the tying mechanism by means of a swinging wire guide mechanism, generally designated 11. After both pairs of wires have been received by the tying mechanism, it ties wires 4 and 6 and wires 5 and 7, together through a twisting action at the completion of which each of the four wires is severed sequentially.

After completion of the tying and severing operation, needles 8 are retracted and the swinging wire guide mechanism 11 swings towards the left in Fig. 1 to hold the upper wires away from the tying mechanism. During the downward movement of the needles, the joined upper and lower wires are drawn down through the baler chamber and the compressed mass of hay, in advance of the reciprocating plunger, forces the wires along the chamber, as indicated at 4a in Fig. 1. When a sufficient mass of hay has again been compressed within the chamber, the entire baler mechanism again cooperates to form another individual bale. This cycle of operations is repeated as long as material continues to be fed to the baler chamber.

Structural organization of tying mechanism

The details of the tying mechanism are shown particularly well in Figs. 3 and 4. As indicated in these figures, the tying mechanism includes a gear 12 which is in driving engagement with two sets of twister pinions 13 and 14. The gear and pinions are surrounded by a casing 15, a portion of which has been cut away to facilitate the illustration of the internal construction.

As shown in Fig. 4 each set of twister pinions includes two pinion portions. Set 13 comprises an upper and a lower portion 16 and 17, respectively, while the upper and lower portions of set 14 are designated 18 and 19, respectively. It will be noted that each portion 16 and 19 has a tooth face width greater in extent than that of portions 17 and 18. The reason for the difference in face widths will be explained more fully hereinafter.

With reference to this same figure, it will be noted that both sets of pinions are reduced in diameter, as at 20, to form projecting shoulders 21 for bearing engagement with openings 22 formed in casing 15.

The forward portion of the casing adjacent openings 22 is formed to define tapered slots 23 which aid in guiding the baling wires as they are supplied to spaced wire receiving slots 24 formed in the twisted pinions.

It is to be noted that one of the slots indicated at 25 in pinion portion 16 of set 13 is slightly wider than the other slots that are illustrated in Fig. 3. One of the wire receiving slots of portion 19 is also enlarged in a fashion similar to slot 25 but cannot be seen in Fig. 3 since it is on the bottom side of twister pinion set 14. It is further to be observed that the wire receiving slots of each portion of each set of pinions are correspondingly positioned so that the slots can be aligned to form a pair of unobstructed slots or passageways extending from the exterior to the interior of each set of pinions.

Gear 12 is in driving engagement with both sets of twister pinions and imparts controlled rotation to the pinions making possible the receipt of the wires to be joined and their subsequent twisting and severance in a manner to be described more fully hereinafter.

Figure 5:
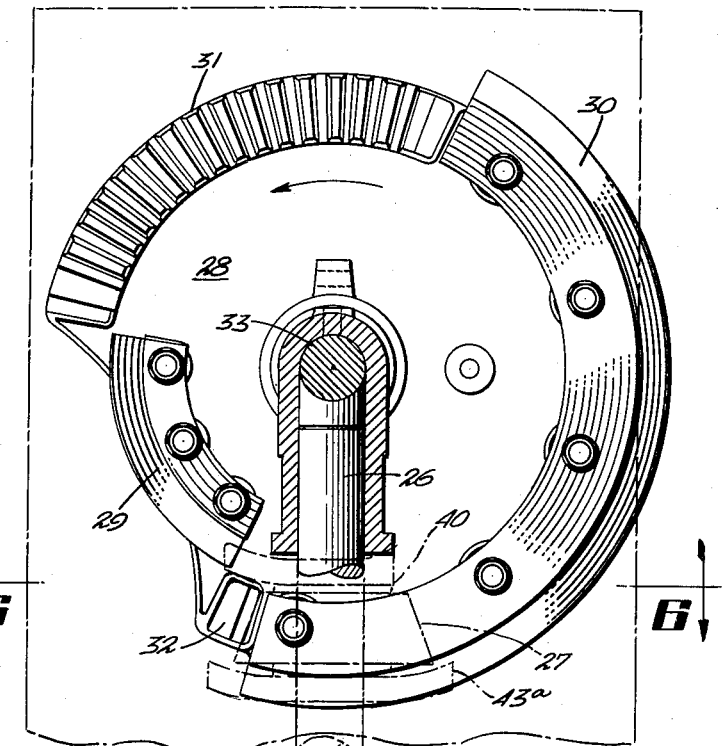
Fig. 5 is a vertical sectional view taken on plane 5—5 of Fig. 2 showing to an enlarged scale a special bevel gear which is a principal component of the intermittent driving means for operating the tying mechanism.
Figure 6:
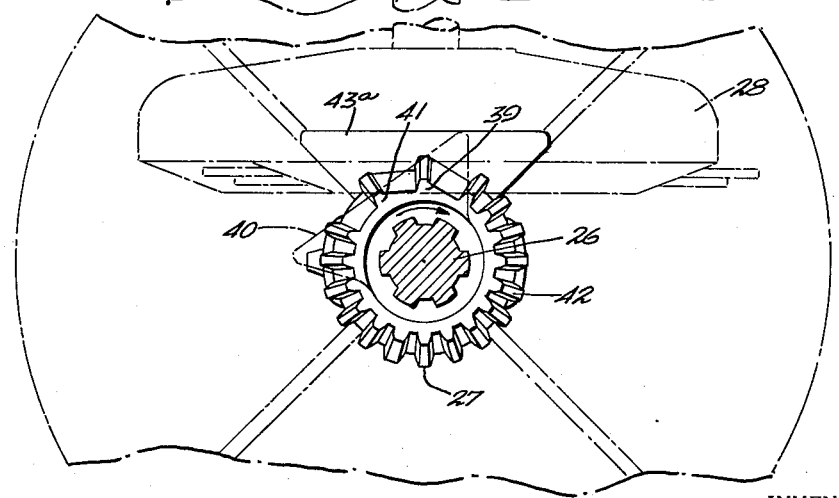
Fig. 6 is a horizontal sectional view taken on plane 6—6 of Fig. 5 showing a special bevel pinion which cooperates with the bevel gear shown in Fig. 5.

Gear 12 is splined to shaft 26 to which is also attached a driving pinion 27, see Figs. 2, 5 and 6. With specific reference to these figures, it will be noted that pinion 27 is engaged with a special bevel gear 28 to which is attached rotary slides 29 and 30. The bevel gear 28 also includes a plurality of gear teeth 31 and a single buttress tooth 32. These various elements of the bevel gear cooperate with pinion 27 and impart intermittent motion to shaft 26 in a manner that will now be described.

Structural details of the intermittent driving means

Bevel gear 28 is secured to shaft 33 to which is also secured needle cams 10 and cam 34 which actuates the swinging wire guide mechanism 11. See Fig. 2. A clutch mechanism, generally designated 35, is secured to sprockets 36 which are continuously driven from a power source (not shown) on the baler. When sufficient hay has been accumulated within the baler chamber, a timing mechanism employing broadly the principles disclosed in the Vutz et al. Patent 2,498,319 issued on February 21, 1950 covering a Baler Mechanism, which comprises no part of this present invention and hence is not illustrated and will not be described, is tripped which engages clutch 35 so that the driving action imparted to sprockets 36 is transferred through the clutch to shaft 33.

As soon as shaft 33 begins its rotations, each needle cam 10 imparts controlled movement to an intermediately pivoted arm 37 which in turn imparts upward movement to one of the needles 8 through an intermediate link 38, see Fig. 1.

Simultaneously, rotation is imparted to bevel gear 28 and cam 34. Cam 34 immediately swings the wire guide mechanism 11 towards the right in Fig. 1 to bring baling wires 4 and 5 into engagement with the motionless outstanding wire receiving slots of the twister pinions which are then in alignment with tapered slots 23 of casing 15. Immediately thereafter, and during the continuing rotation of shaft 33, buttress tooth 32 of bevel gear 28 comes into engagement with buttress tooth 39 of pinion 27. Engagement of buttress tooth 32 with buttress tooth 39 imparts a fraction of a turn to bevel pinion 28 and carries the bevel pinion, with its associated shaft 26 and gear 12, from one position of rest to a second position of rest. The proportionality of the bevel gear 28, pinion 27, gear 12 and twister pinions is such that one-half of a revolution is imparted to each set of twister pinions. At the completion of this partial revolution, an upper stop member 40, secured to pinion 27, comes into sliding engagement with rotary slide 29 which holds the pinion motionless as the bevel gear continues to rotate.

During that part of the bevel gear rotation while upper stop member 40 is slideably engaged by slide 29, shaft 33 continues to rotate and the needle cams swing needles 8 up through the baler chamber into position to deliver baling wires 6 and 7 into the other set of slots in the respective sets of twister pinions which have been moved into alignment with tapered slots 23 and then held motionless by the partial intermittent rotation of bevel pinion 27. During this later movement of the needles, wire guide mechanism 11 remains motionless.

By the time the lower baling wires have been delivered to the twister pinions, gear teeth 31 have moved into engagement with a second buttress tooth 41 and the conventional teeth 42 formed on pinion 27. Simultaneously, the upper stop member 40 disengages slide 29 and permits rotary movement of the pinion.

During the rotation of pinion 27 by bevel gear teeth 31, gear 12, which is splined to common shaft 26 with pinion 27, undergoes a partial rotation, which in turn imparts several full turns to both sets of twister pinions. During the several revolutions of the sets of twister pinions, the baling wires, engaged in their wire receiving slots, are twisted together so as to be joined both above and below each set of twister pinions. See Fig. 14.

While gear teeth 31 are still in engagement with and driving pinion 27, portions 17 and 18 of the sets of twister pinions are momentarily held motionless in a manner to be described hereinafter. Since portions 16 and 19 of the respective sets of twister pinions continue to move in response to the movement of gear 12, relative movement is produced between the two portions of each set which causes the baling wires to be severed as will be described.

After the baling wires have been severed, lower stop member 43a of pinion 27 comes into sliding engagement with slide 30, and shaft 33 continues to rotate while bevel pinion 27 and its associated gear 12 remain motionless. During this latter rotation of shaft 33, the needle cams 10, swing needles 8 downwardly out of the baler. The needles drag behind them the baling wires (see Fig. 15) which are subsequently forced along the bale chamber by the advancing mass of hay.

It is to be noted that the angular spacing of buttress teeth 39 and 41 of pinion 27 is equal to the angular spacing between the faces of upper and lower stop members 40 and 43a, respectively. Because of this equal angular positioning of elements, buttress tooth 32, in engaging buttress tooth 39, imparts sufficient rotation to pinion 27 to carry lower stop member 43a away from slide 30 and to carry stop member 40 into a position of sliding engagement with slide 29.

As shaft 33 and attached bevel gear 28 approach the position indicated in Fig. 5, clutch 35 is gradually disengaged by means not shown, since it forms no part of this invention. When the clutch has been fully disengaged, shaft 33 and its associated bevel gear and cams again comes to rest and remains at rest until clutch 35 is again engaged by the timing mechanism, signifying that a sufficient mass of hay has been accumulated and compacted within the baler chamber to form a new bale. The tying mechanism also remains at rest (see Fig. 3) while hay for the new bale is being accumulated.

*Swinging wire guide mechanism*

The swinging wire guide mechanism does not constitute a part of the present invention but will be described briefly herein to facilitate a complete understanding of the construction and operation of the tying mechanism.

The wire guide mechanism has been described and claimed in Patent No. 2,690,114, issued September 28, 1954, entitled, Wire Handling Mechanism for Baler.

This mechanism includes a pair of arms 43 which are pivoted at 44 for fore and aft swinging movements away from and toward the twister pinions, respectively. As indicated in Fig. 2, arms 43 are laterally spaced to correspond to the lateral spacing of tapered slots 23 and the center lines of the sets of twister pinions. As indicated in Fig. 1, arms 43 are rigidly joined by a transverse bar 45 from which a cam follower arm 46 extends rearwardly for engagement with cam 34. As cam 34 rotates conjointly with shaft 33, controlled swinging movements are imparted to arms 43. Since baling wires 4 and 5 are threaded through the arms 43 as indicated in Fig. 1, movement of the arms carries these baling wires towards and away from the sets of twister pinions.

The arms 43 have two extreme positions of rest at which they are disposed during most of the rotation of shaft 33. While shaft 33 is at rest and hay is being accumulated in the baler chamber for a new bale, arms 43 remain in the full line position shown in Fig. 1. In this position baling wires 4 and 5 are held away from the twister pinions so that the baling wires may freely enter the baling chamber without obstruction by the pinions and without wearing or abrading the pinion slots. See Fig. 15.

As soon as shaft 33 begins to rotate after the engagement of clutch 35, arms 43 are swung from the full line position to the phantom line position, indicated in Fig. 1. This motion of these arms carries baling wires 4 and 5 into the outstanding slots of the twister pinions, tapered slots 23 in casing 15 acting to guide the wires to the pinion slots. Arms 43 remain in the phantom line position while baling wires 6 and 7 are delivered to the twister pinions by needles 8 and also remain in this same position during the time that the baling wires are being twisted together. See Fig. 14.

Immediately after the severance of the baling wires, cam 34 swingings arms 43 from the phantom line position back to the full line position. It is to be observed that arms 43 remain in the full line position while a new bale is being formed within the baler. During the formation of the new bale, wire is gradually pulled into the baler chamber by the advancing hay and gradually slides through needles 8 and arms 43 during the process. The forward position of the arms 43 prevents the severed knot, which joins the upper and lower baling wires, from entering the sets of twister pinions and becoming jammed there.

*Structural details of the twister pinion sets*

Figure 7:
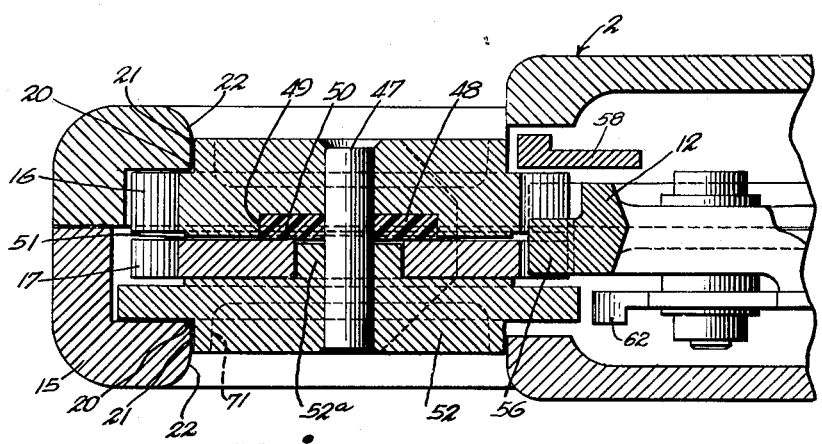
Fig. 7 is a vertical sectional view through a set of twister pinions taken on plane 7—7 of Fig. 3.

The structural details of one set of twister pinions are illustrated fully in Fig. 7 which shows the upper portion 16 and the lower portion 17 of the pinion set in engagement with gear 12. A central pivot pin 47 holds the portions together and centralizes them for relative rotation.

A bearing insert 48 is force fitted into a complementary pocket 49 formed in pinion portion 16. Face 50 of the bearing insert projects slightly below face 51. The projection of the insert is exaggerated in Fig. 7 to facilitate the illustration and in fact is only about .005 inch.

It has been found from actual experiments that a very considerable force is generated by the twisting together of a pair of baling wires. The force produced tends to force each portion of the pinion set towards the opposite portion thereby necessitating bearing insert 48. This insert acts as a thrust bearing and may be made from sintered bronze, laminated plastic or any other material suitable for such service.

Shearing of the baling wires, after being twisted together by a set of twister pinions, is accomplished by relative rotation of the pinion portion of each set. The edges of the slots formed in the pinion portions are square, sharp, and hard and readily cooperate to shear the relatively soft baling wires. Part of the means for producing relative motion between the pinion portions will now be described.

Each set of twister pinions includes a rotary stop member 52 which is engaged with pivot pin 47. Stop member 52 is formed to define an upstanding annular boss 52a which is force fitted into a hole formed centrally in pinion portion 17. This force fit is so tight that the pinion portion and stop member are constrained to rotate conjointly.

Each set of twister pinions is interchangeable with the other; thus the contour of the rotary stop member can be noted in Fig. 3. With reference to this figure, it will be noted that each stop member has a generally circular peripheral portion 53 in which is formed diametrically opposed wire receiving slots 54 which are correspondingly positioned with slots 24 of the adjacent pinion portion. Two diametrically opposed cambered faces 55 are also formed on each rotary stop member. These cambered faces cooperate with motion arresting means secured to gear 12 which will be described in detail hereinafter.

A particularly important feature of the present invention is the proportionality of the face widths of the teeth of pinion portions 16 and 17. This proportionality has been carefully illustrated in Fig. 7 in which it should be noted that the gear 12 embraces the teeth of both pinion portions 16 and 17. The face width of the teeth on gear 12 is reduced for a certain part of its periphery to permit relative motion between the pinion portions which is necessary for shearing of the baling wires, as will be described more fully hereinafter. A tooth having such a reduced face width is illustrated at 56 in Fig. 7.

*Motion arresting means for twister pinions*

As has been explained generally hereinbefore, the two portions of each set of twister pinions are rotated conjointly while receiving the baling wires to be joined and while twisting the wires together. At the completion of the twisting operation, relative motion must be produced between the pinion portions in order to shear the baling wires. The means for arresting the motion of one portion of each set of pinions is illustrated in detail in Fig. 3.

From this figure it will be noted that an enlargement 57 is formed in gear 12 near its periphery. To this enlargement a stop plate 58 is bolted as at 59. The stop plate has a circular peripheral face 60 having its center of curvature coincidental with the center line of shaft 26. Face 60 cooperates with the rotary stop member of twister pinion set 14 and, while in slideable engagement with one of its faces 55, holds the pinion portion 18 motionless while pinion portion 19 continues to be driven by gear 12. The exact cooperation between these parts will be described in detail shortly.

It is to be noted that stop plate 58 is radially adjustable relative to gear 12 by virtue of a tapered curved wedge member 61 which bears against stop plate 58. Wedge member 61 is bounded by an inner circular face 61d having its center of curvature coincidental with the center of shaft 26 and an outer circular face 61c, the center of curvature of which is slightly displaced from the center of shaft 26. Further, wedge member 61 is slotted, as at 61a, and the stop plate 58 has radial slots 58a through which the bolts at 59 pass. These radial slots make possible a limited amount of radial adjustment in the position of the stop plate. To accomplish such adjustment it is merely necessary to loosen the bolts which hold stop plate 58 and wedge member 61 to enlargement 57 and thereafter to adjust the relative angular position of wedge member 61 to effect a radial movement of the stop plate and establish a close sliding fit with faces 55 of the rotary stop member. Face 61b of wedge 61 cooperates with a similarly curved portion 61d formed on an enlargement 57. Since face 61c has a center of curvature different from face 61b and face 61c corresponds to the adjacent face of stop plate 58, movement of the wedge relative to the enlargement 57 produces a purely radial motion of stop plate 58, peripheral face 60 of stop plate 58 thereby being maintained concentric with gear 12.

An identical stop plate and wedge installation is also provided on the bottom side of gear 12. A part of the stop plate can be seen at 62 in Fig. 3. Stop plate 62 is provided to arrest the motion of the rotary stop member included in twister pinion set 13. It is to be noted that stop plate 58 cooperates only with the rotary stop member of twister pinion set 14 whereas stop plate 62 cooperates only with the rotary stop member of twister pinion set 13. Since the operation of both stop plates with their respective sets of twister pinions is identical, it is only necessary to describe the operation with respect to one set of twister pinions, such as 14.

*Twister pinion operation*

The operation of a set of twister pinions can best be understood by reference to Figs. 8 through 13, inclusive, which show successive positions of one set of twister pinions 14 as it twists together baling wires 5 and 7 and subsequently shears them.

The set of twister pinions, shown in Fig. 8, has just completed twisting together the baling wires to be joined, four full twists having been imparted to the wires. In the position shown in this figure, the portions of the twister pinions are correspondingly positioned, and gear teeth and wire receiving slots are in perfect alignment. Both pinion portions are fully engaged by teeth of full width on gear 12 as indicated at 64 in Fig. 9. It is to be noted that stop plate 58 is approaching one of the cambered faces 55 of the rotary stop member. The leading edge of the stop plate is curved as at 65 to avoid interference as it approaches cambered face 55.

The next successive position of the set of twister pinions is illustrated in Fig. 10 which shows stop plate 58 in sliding engagement with face 55 of the rotary stop member. While these parts are thus positioned, the rotary stop member and its associated pinion portion 18 are held motionless while gear 12 and pinion portion 19 continue to rotate. This condition is made possible by a cut-away portion 66 of the teeth of gear 12. This cut-away portion is of sufficient depth to provide complete clearance for the teeth of pinion portion 18 and is of a circumferential extent equal to that of stop plate 58. It is to be noted that the remaining toothed portion of gear 12 is fully engaged with the teeth of pinion portion 19 and continues to drive this pinion portion producing relative motion between portions 18 and 19. This relative motion produces a shearing action between the wire receiving slots 24 as indicated in Fig. 10. With reference to this same figure, it will be apparent that one of the baling wires is sheared by the relative motion before the second baling wire, by virtue of the fact that one of the four slots in the set of twister pinions is of greater width than the other three slots. The desirability of having the wires sheared in sequence will be considered more fully hereinafter.

Fig. 12 shows the next successive position of the gear and twister pinion set 14 after the completion of the shearing operation. From this view, it will be obvious that the relative rotation of pinion portion 19 is continued until both the pinion portions are again in corresponding positions with their gear teeth and wire receiving slots in alignment. Beginning with tooth 68, the teeth of gear 12 again have full depth and act to rotate the pinion portions 18 and 19 conjointly and to hold them in exact alignment. As the movement of gear 12 continues, stop plate 58 is gradually carried away from cambered face 55; and pinion portion 18, the motion of which was previously arrested, again rotates at a rate identical with that of pinion portion 19.

Gear 12 continues to rotate and drive the set of twister pinions until it finally comes to rest in the position illustrated in Fig. 3. It should also be observed that both pinion sets 13 and 14 finally come to rest with wire receiving slots in alignment with the tapered slots 23 of casing 15.

A feature that must be appreciated for a complete understanding of the subject device is that the cut-away portion of gear teeth at 66, which permits pinion portion 18 of pinion set 14 to remain at rest, does not interfere with the operation of pinion set 13. This condition is made possible by the remaining depth of the gear teeth indicated at 67 (see Fig. 11) which is sufficient to embrace both pinion portions 16 and 17 in set 13 as illustrated specifically in Fig. 7 at 56.

It should also be appreciated that a portion of the gear teeth on the bottom side of gear 12 is also reduced in face width adjacent stop plate 62 to permit rotary stop member 52 of twister pinion set 13 (see Fig. 4) to be held motionless by stop plate 62. In a similar fashion to that described with reference to pinion set 14, the reduction in tooth width adjacent stop plate 62 does not interfere with the driving action of gear 12 on pinion set 14.

Interchangeability, wear and stresses

The components of both sets of swister pinions 13 and 14 are identical in all respects. As illustrated in Fig. 3, however, the sets of twister pinions are installed in casing 15 in inverted relationship, the rotary stop member of set 13 being on the bottom of the assembly whereas it is on the top of the assembly in pinion set 14. The maximum diameter of the rotary stop member is slightly larger than the outside diameter of the twister pinion teeth, with the result that pocket 69 formed in casing 15 is slightly larger in diameter than pocket 70. This difference of diameter prevents the insertion of a pinion assembly in the casing in improper, upside down relationship since the rotary stop member of pinion set 14 must be on the top of the assembly to permit introduction of the set into pocket 70. Fig. 4 illustrates the relative size of the pockets 69 and 70 and their relationship to the rotary stop members.

Since the two sets of twister pinions are identical in all respects, it will be appreciated that identical upper and lower sections can be used for casing 15.

It will be apparent to those skilled in the art that due regard must be given to the stresses caused by the acceleration of pinion portions 17 and 18 as they are engaged by gear 12 after having been at rest during the shearing operation. The peak stress on the pinion teeth can be minimized by reducing as far as practical the mass of the pinion portions 17 and 18 as by formation of recesses 71 within the pinion portions.

The unique structural arrangement of the present invention makes it possible to distribute the peak stresses among several twister pinion teeth. In the preferred embodiment, a ratio of 5 to 1 has been provided between the gear 12 and the pinion portions 16 and 19 which are constantly in mesh with gear 12. Thus, for each complete revolution of gear 12 both pinion portions 16 and 19 execute five full revolutions. Since pinion portions 17 and 18 are at rest during a part of the rotation of gear 12, it will be apparent that the gear ratio between gear 12 and these pinion portions must be somewhat less than 5 to 1. Since the pinion portions must come into alignment after the baling wires are severed, a gear ratio of 4½ to 1 is the largest possible ratio between gear 12 and pinion portions 17 and 18 that will fulfill this requirement. Adoption of this gear ratio has the additional benefit of presenting diametrically opposite twister pinion teeth for engagement by gear 12 when pinion portions 17 and 18 are suddenly accelerated and brought into motion again at the end of the shearing operation.

Furthermore, since the sets of twister pinions are completely interchangeable, it will be understood that such interchange of the sets will bring into use two entirely different pairs of teeth on pinion portions 17 and 18 which must bear the shock loads incidental to the sudden acceleration of these pinion portions after the baling wires are severed.

Interchange of the sets of pinions has an additional benefit since the opposite sides of the wire receiving slots are brought into use to sever the baling wires. Thus, in effect, the cutting life of each set of twister pinions is doubled since, when one set of cutting edges is worn out, the sets of twister pinions can be interchanged and the unused cutting edges can be brought into use.

It should be understood that a tying mechanism of the type disclosed operates at a relatively high rate of speed and that a substantial shearing force must be provided to sever the baling wires. If all four baling wires were severed simultaneously, a serious shock load would be imposed on shaft 26 and all of the associated driving elements which cooperate to produce the shearing action. In order to avoid this condition, the tying mechanism has been arranged so that the baling wires are sheared in seriatim; this sequential severance of the wires is accomplished in part by provision of one wire receiving slot in each set of twister pinions which is wider than the other slots in the set. With reference to Fig. 10, it will be observed that the effect of the wider slot is to permit the first wire to be severed in advance of the severance of the second wire.

Furthermore, stop plates 58 and 62 can be angularly spaced on gear 12 so that the motion of pinion portion 17 is arrested slightly in advance of pinion portion 18. This timing of the beginning of severance in the respective sets of pinions, when combined with the wider wire receiving slots, results in the wires being severed sequentially, i. e. pinion set 13 severs wires 4 and 6 successively and prior to the successive severance of baling wires 5 and 7 by pinion 14.

It is important to note that the tying mechanism herein disclosed knots together associated baling wires in such a way that unraveling of the knots is practically impossible. Thus, with reference to Fig. 15, it will be observed that ends of the wires adjacent each knot are divergent and project for a sizable distance. These projecting ends effectively resist any untwisting action to which the knot may be subjected, particularly any tendency to untwist produced by tension imposed on the wires.

Another important feature of the present invention is that each and every knot is perfectly uniform. This is an advantage and inherently follows from the fact that the knotted sections formed above and below each set of twister pinions are severed midway therebetween. Thus, the tying mechanism can be relied upon to produce uniform secure knots at all times.

From the foregoing description of a preferred embodiment of my invention, it will be apparent that a unique tying mechanism of superior design has been evolved for rapidly and efficiently binding bales of hay and similar materials.

Having described a preferred embodiment of my invention, I claim:

1. In a tying mechanism of the type constructed and arranged to twist together two pairs of baling wires and to shear each of the wires sequentially after the completion of the twisting operation, a gear, driving means for imparting predetermined intermittent motion to said gear, two sets of twister pinions in meshed engagement wtih said gear, each set of twister pinions comprising a first and a second pinion portion, means on said gear for periodically arresting the motion of one portion of each set of twister pinions, both portions of each set of twister pinions being formed to define a pair of correspondingly positioned spaced wire receiving slots, one slot in one portion of each set of twister pinions being wider than the remaining slots in the set, said driving means holding said sets of twister pinions motionless with slots aligned while a first pair of baling wires is received thereby, said driving means imparting a partial rotation to said sets of twister pinions thereafter whereby the remaining slots are indexed and held motionless in wire receiving position after which the second pair of baling wires is delivered to said sets of twister pinions, said driving means imparting rotation to said gear thereafter whereby the baling wires are twisted together, one portion of each set of twister pinions being held motionless by said arresting means at the completion of the twisting operation, the portions of said sets of twister pinions being arrested sequentially whereby each baling wire is sheared in sequence by the relative motion between the respective portions of each set of twister pinions.

2. In a baler tying mechanism for joining pairs of baling wires, a gear, means for imparting controlled intermittent rotation to said gear, two sets of twister pinions in meshed engagement with said gear, each of said sets comprising a first portion in constant mesh with said gear and a second portion temporarily out of mesh with said gear during its rotation, means attached to said gear to engage said second portions of said pinion sets whereby these portions are held motionless while out of mesh with said gear, both portions of each pinion set being formed to define diametrically opposed wire receiving slots, said intermittent driving means imparting predetermined motion to said gear whereby said sets of pinions are held motionless while a first wire is supplied to each set after which said pinion sets are given a partial rotation and again held motionless whereby the opposed slots are positioned for receiving a second pair of baling wires supplied thereto, after which said pinion sets are rotated for several full revolutions, said second pinion portions thereafter being held motionless by said gear means whereby relative motion is produced between said pinion portions of each set and the baling wires are severed.

3. In a bale tying mechanism for joining pairs of baling wires, a gear, intermittent driving means for imparting predetermined motion to said gear, a plurality of sets of twister pinions in driven engagement with said gear, each set of twister pinions comprising a first portion in mesh with said gear at all times and a second portion in mesh with said gear during part of its rotation, both portions of each set of pinions being formed to define spaced wire receiving slots, said driving means holding said pinion sets stationary while a first group of wires is supplied to the slots in each set of twister pinions, said driving means imparting motion thereafter to said gear whereby the remaining slots of said sets of twister pinions are moved to wire receiving positions after which a second group of baling wires is received by the other slots of said sets of pinions, said driving means thereafter imparting predetermined rotation to said gear whereby the wires are twisted together by said sets of twister pinions, and means on said gear for engaging said second portion of each set of twister pinions to hold it motionless while it is out of engagement with said gear whereby relative motion is established between the portions of said sets of twister pinions and the twisted wires are sheared.

4. In a tying mechanism a gear, driving means for imparting predetermined intermittent movements to said gear, two sets of twister pinions in meshed engagement with said gear, each set of twister pinions comprising a portion which is in meshed engagement with said gear at all times and a second portion which is in mesh with said gear for only a part of its rotation, means for arresting the motion of said second portion of each set of twister pinions while out of mesh with said gear whereby relative movement is produced between the first and second portions of each set of pinions, each portion of each set of twister pinions being formed to define correspondingly positioned spaced wire receiving slots, one slot of one portion of each set of twister pinions being of greater width than the remaining slots of the twister pinion set, said pinion sets remaining motionless while one of a first pair of wires is supplied to each set of twister pinions, said driving means imparting rotation thereafter to said gear whereby the second aligned wire receiving slots are positioned to receive a second pair of baling wires, said driving means imparting motion to said gear thereafter whereby the baling wires received by each set of twister pinions are twisted together, subsequently the second portion of each set of twister pinions being held motionless sequentially by said arresting means during a portion of the gear rotation whereby the wires being twisted together are sheared in seriatim.

5. In a baler tying mechanism for joining a pair of baling wires, a gear, means for imparting controlled intermittent rotation to said gear, a set of twister pinions in meshed engagement with said gear, said set comprising a first portion in constant mesh with said gear and a second portion temporarily out of mesh with said gear during a part of its rotation, means attached to said gear for engaging said second portion of said pinion set whereby it is held motionless while out of mesh with said gear, both portions of said pinion set being formed to define correspondingly positioned spaced wire receiving slots, said intermittent means imparting predetermined motion to said gear whereby said pinion set is held motionless while a first wire is supplied to one pair of corresponding wire receiving slots after which said set is given a partial rotation and again held motionless whereby another pair of corresponding slots is positioned for receiving a second baling wire supplied thereto, after which said set is rotated for several full revolutions, said second pinion portion thereafter being held motionless by said means on said gear whereby relative motion is produced between said pinion portions and the baling wires are severed.

6. Apparatus as defined in claim 5 and, in addition, means on said gear for adjusting the relative position between said second pinion portion and said means provided to engage said second portion to hold it motionless during a part of the gear rotation.

7. An improved baler tying mechanism for joining pairs of baling wires comprising a gear, means for imparting predetermined intermittent rotation to said gear, a plurality of sets of twister pinions in driven engagement with said gear, each set of twister pinions comprising a first portion and a second portion, said first portion having a greater face width than said second portion and being in mesh with said gear at all times, the teeth on said gear being of reduced face width for certain portions of its periphery whereby said second portion of each twister pinion set may remain motionless and out of engagement with the teeth of said gear during part of its rotation, each portion of each set of pinions being formed to define a pair of correspondingly positioned spaced wire receiving slots, said means for driving said gear holding said gear and pinion sets stationary while a first wire is supplied to one pair of aligned slots in each set of twister pinions, said means thereafter imparting motion to said gear whereby the remaining pairs of slots in said sets of twister pinions are moved to wire receiving positions, after which a second wire is supplied to each of the other pairs of slots in said sets of pinions, said means for driving said gear thereafter imparting predetermined rotation to said gear whereby said sets of twister pinions are both rotated simultaneously and the first and second wires are twisted together in pairs, and motion arresting means on said gear adjacent each portion having teeth of reduced face width, said last named means engaging the second portions of said sets of twister pinions to hold them motionless while out of engagement with said gear whereby relative motion is established between the portions of said sets of twister pinions and the twisted wires are sheared.

8. Apparatus as defined in claim 7 and, in addition, means on said gear for adjusting the relative position between said second pinion portions and said means provided for arresting the motion of said second pinion portions.

9. In combination in a hay baler for producing bales bound with baling wire, a tying mechanism comprising a rotatable twister pinion set including a first pinion portion and a second pinion portion rotatable relative to said first pinion portion, said pinion portions having pairs of correspondingly positioned wire receiving slots, a gear in said tying mechanism for imparting controlled rotation to said twister pinion set, intermittent driving means connected to said gear, a periodically rotated shaft for driving said intermittent driving means, a cam secured to said shaft for conjoint rotation therewith, a wire-carrying needle connected to said cam for controlled movements in response to the rotation thereof, rotation of said shaft imparting movement to said needle while simultaneously driving said intermittent driving means which, through said gear, first imparts a fraction of a revolution to said pinion and then holds said pinion stationary with a first baling wire engaged with a pair of correspondingly positioned slots in said twister pinion portions while said needle delivers a second wire to the other set of correspondingly positioned slots in said twister pinion portions, said intermittent driving means thereafter imparting a plurality of twisting revolutions to said twister pinion set.

10. Apparatus as defined in claim 9 and, in addition, means on said gear for arresting the motion of one portion of said twister pinion set while the other portion is continuously driven by said gear whereby relative motion is produced between the pairs of slots in said twister pinion portions and the twisted baling wires are sheared.

11. In a baler tying mechanism for joining a pair of baling wires, a gear, means for imparting rotation to said gear, a set of twister pinions in meshed engagement with said gear, said set comprising a first portion in constant mesh with said gear and a second portion temporarily out of mesh with said gear during a part of its rotation, a rotary stop member secured to said second pinion portion for conjoint rotation therewith, and a stop plate secured to said gear in position to engage said rotary stop member while said second pinion portion is temporarily out of mesh with said gear whereby said second pinion portion is temporarily held motionless while said first pinion portion continues to be rotated by said gear.

References Cited in the file of this patent

UNITED STATES PATENTS

| Number | Name | Date |
|---|---|---|
| 661,015 | Kennedy et al. | Oct. 30, 1900 |
| 949,857 | Sweeney | Feb. 22, 1910 |
| 1,004,555 | Brooks | Oct. 3, 1911 |
| 1,046,891 | Stephens | Dec. 10, 1912 |
| 1,490,146 | Troyer | Apr. 15, 1924 |
| 1,757,817 | Simpson | May 6, 1930 |
| 2,456,476 | West et al. | Dec. 14, 1948 |
| 2,485,001 | Kane | Oct. 18, 1949 |
| 2,536,582 | Swift | Jan. 2, 1951 |